US012151481B2

(12) United States Patent
Jin et al.

(10) Patent No.: US 12,151,481 B2
(45) Date of Patent: Nov. 26, 2024

(54) PRINTING APPARATUS AND INK REFILL METHOD THEREOF

(71) Applicant: SEMES CO., LTD., Chungcheongnam-do (KR)

(72) Inventors: Won Yong Jin, Jeollabuk-do (KR); Ho Sang Lee, Chungcheongnam-do (KR); Suk Won Jang, Gyeonggi-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 275 days.

(21) Appl. No.: 17/844,838

(22) Filed: Jun. 21, 2022

(65) Prior Publication Data

US 2023/0034437 A1 Feb. 2, 2023

(30) Foreign Application Priority Data

Jul. 28, 2021 (KR) ........................ 10-2021-0099081

(51) Int. Cl.
*B41J 2/175* (2006.01)

(52) U.S. Cl.
CPC ....... *B41J 2/17506* (2013.01); *B41J 2/17563* (2013.01)

(58) Field of Classification Search
CPC ................ B41J 2/17506; B41J 2/16544; B41J 2/16585; B41J 2/1752; B41J 2/17553; B41J 2/1721; B41J 2/17563; B41J 29/02; B41J 29/17
See application file for complete search history.

(56) References Cited

U.S. PATENT DOCUMENTS

| | | | |
|---|---|---|---|
| 5,801,735 A | 9/1998 | Lorenze, Jr. et al. | |
| 9,004,655 B2 * | 4/2015 | Tamaki | B41J 2/1752 347/108 |
| 2008/0100679 A1 | 5/2008 | Tyvoll et al. | |

FOREIGN PATENT DOCUMENTS

| | | |
|---|---|---|
| KR | 10-0503082 | 7/2005 |
| KR | 10-2006-0093077 | 8/2006 |
| KR | 10-1397307 | 5/2014 |
| KR | 10-2018-0053431 | 5/2018 |

OTHER PUBLICATIONS

Office Action dated May 9, 2023 for Korean Patent Application No. 10-2021-0099081 and its English translation provided by Global Dossier.

* cited by examiner

*Primary Examiner* — Thinh H Nguyen
(74) *Attorney, Agent, or Firm* — Womble Bond Dickinson (US) LLP

(57) ABSTRACT

A printing apparatus and an ink refill method thereof are provided. The printing apparatus may comprise a printing unit performing printing, and an ink filling unit filling ink in the printing unit in an upward manner, wherein the printing unit includes a printing ink receptor accommodating ink, a spray head spraying the ink, and a pressure controller controlling a pressure of a fluid for operation of the ink, and the ink filling unit includes a supply ink receptor filled with ink for supply to the printing unit, and an ink supply unit mounted on the spray head to supply the ink supplied from the supply ink receptor to the spray head.

18 Claims, 4 Drawing Sheets

[Fig. 1]
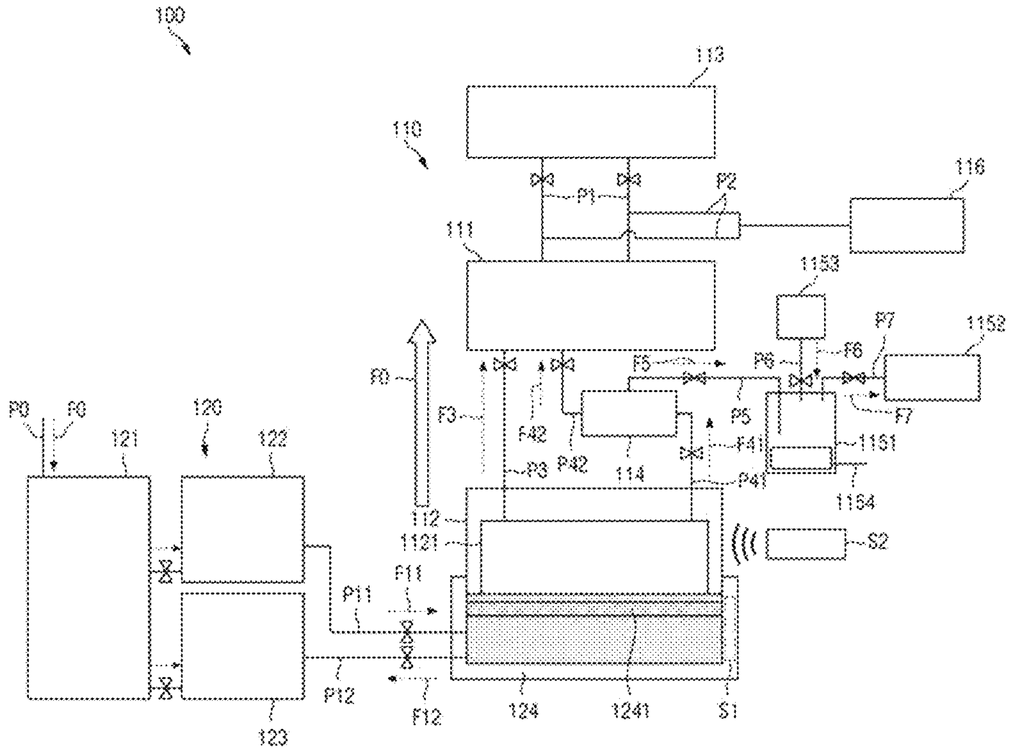

[Fig. 2]
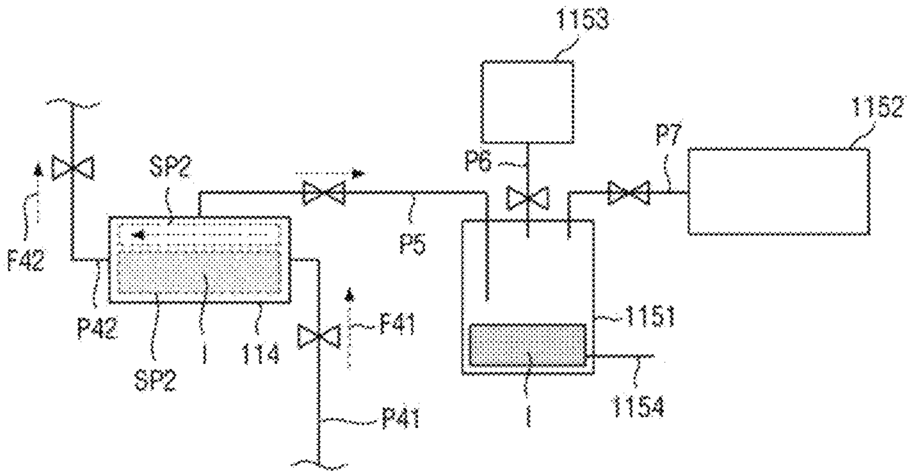
[Fig. 3]
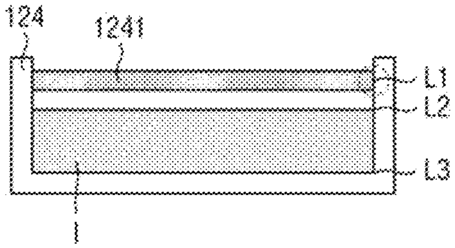
[Fig. 4]
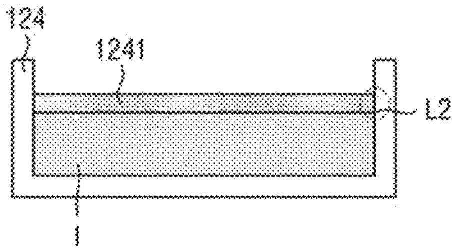
[Fig. 5]
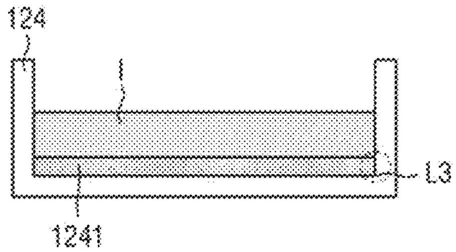

[Fig. 6]
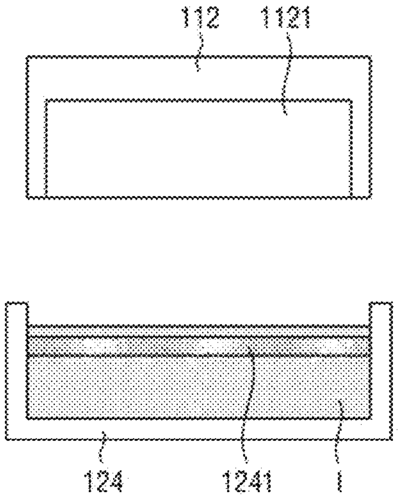
[Fig. 7]
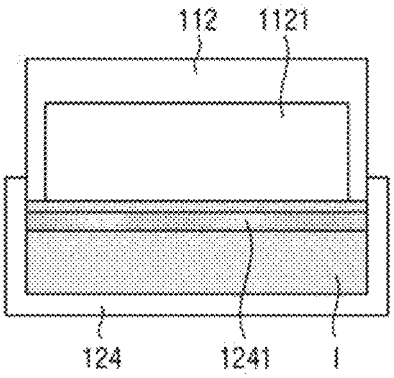

[Fig. 8]
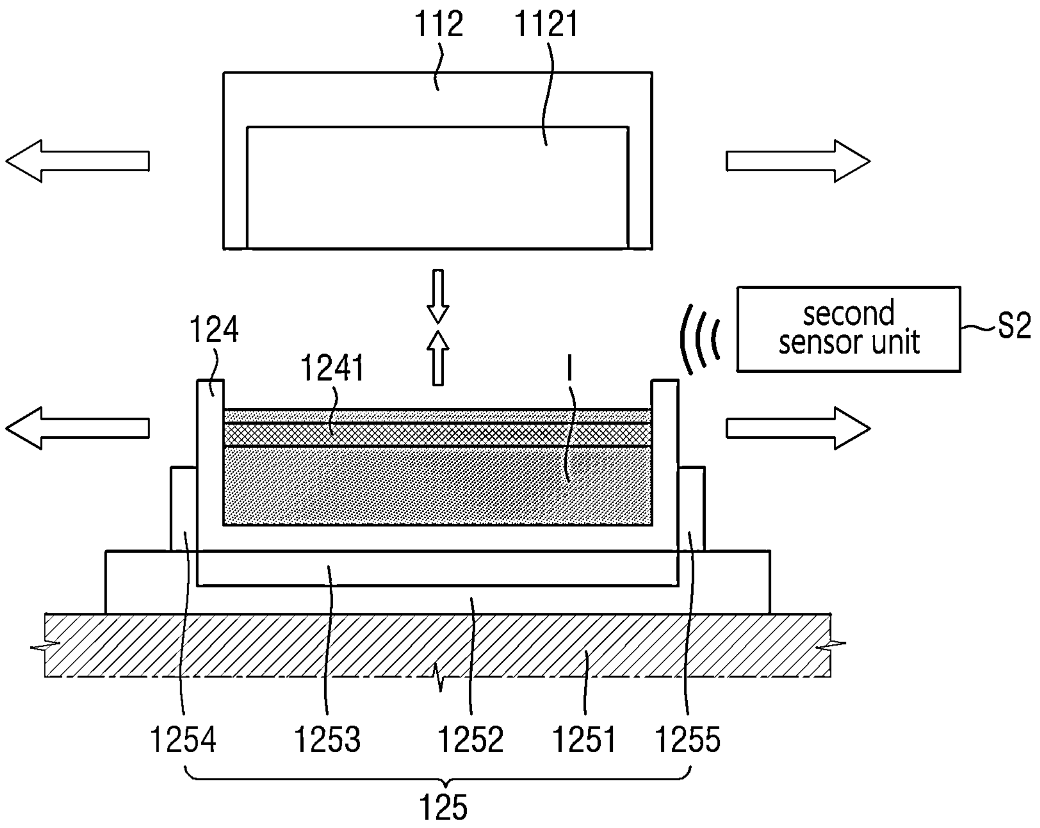
[Fig. 9]
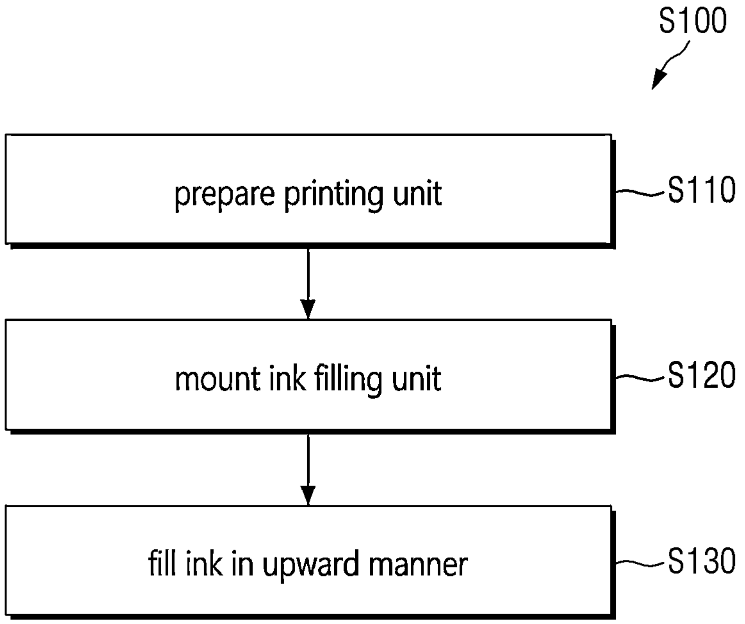

PRINTING APPARATUS AND INK REFILL METHOD THEREOF

CROSS-REFERENCE TO RELATED APPLICATION

This application claims priority from Korean Patent Application No. 10-2021-0099081 filed on Jul. 28, 2021 in the Korean Intellectual Property Office and all the benefits accruing therefrom under 35 U.S.C. 119, the contents of which in its entirety are herein incorporated by reference.

BACKGROUND

Technical Field

The present disclosure relates to a printing apparatus and an ink refill method thereof.

Description of the Related Art

Ink printing technology in the field of display is one of major technologies emerging in the current industry, especially in the high-value added display industry, which can be produced at a room temperature/in the atmosphere, beyond the concept of production based on vacuum deposition. However, solution process-based ink printers require tight ink filling in pipes, circulation pumps and printer heads in utilizing ink. To this end, a method of pushing ink from a reservoir to a head with a strong pressure and filling pipes and circulation pumps with ink is applied. This method results in waste of ink, especially when quantum dot-based ink incorporated with high value-added technology is used, it is inevitable that process unit prices and manufacturing costs are increased due to waste of material costs. In addition, the pump applied in this case is an impeller type pump, and its driving state (e.g., circulation, etc.) is determined depending on the presence of a fluid. Therefore, when there is an air pocket or bubbles inside the pump, a problem occurs in driving the pump, and eventually, acts as a factor that causes an abnormality in the operation of an ink circulation system.

BRIEF SUMMARY

An object of the present disclosure is to provide a printing apparatus that may quickly perform a process and improve workability by shortening a filling time of initial ink based on an impeller pump provided with an air pocket extractor.

Another object of the present disclosure is to provide a printing apparatus that may minimize gaps in ink filling.

Still another object of the present disclosure is to provide a printing apparatus that may improve workability and shorten a setting time in setting initial mass production facilities through rapid filling of initial ink in a pump.

Further still another object of the present disclosure is to provide a printing apparatus that may supply ink more effectively at the time when ink re-fill is required due to replacement of a head and related parts.

Further still another object of the present disclosure is to provide a printing apparatus that may reduce material usage and cost by minimizing expensive ink consumption of tens of millions of won per liter.

The objects of the present disclosure are not limited to those mentioned above and additional objects of the present disclosure, which are not mentioned herein, will be clearly understood by those skilled in the art from the following description of the present disclosure.

A printing apparatus according to one aspect of the present disclosure devised to achieve the above objects may comprise a printing unit performing printing, and an ink filling unit filling ink in the printing unit in an upward manner, wherein the printing unit includes a printing ink receptor accommodating ink, a spray head spraying the ink, and a pressure controller controlling a pressure of a fluid for operation of the ink, and the ink filling unit includes a supply ink receptor filled with ink for supply to the printing unit, and an ink supply unit mounted on the spray head to supply the ink supplied from the supply ink receptor to the spray head.

The ink supply unit may be mounted toward an ink spray direction of the spray head to supply the ink.

The ink supply unit may be provided with a filter unit therein to filter the ink filled therein through the filter unit and supply the filtered ink to the spray head.

The filter unit may move up and down inside the ink supply unit in a sliding manner, and is operable in response to a water level of the ink inside the ink supply unit.

The filter unit of the ink supply unit may move to a third height lower than a second height on the ink supply unit when a first condition is provided in which the filter unit is positioned at a first height and the water level of the ink inside the ink supply unit is positioned at the second height lower than the first height.

The filter unit may be operated in a first filter mode reciprocating from the first height to the third height and a second filter mode reciprocating from the second height to the third height.

The filter unit may be operated in a third filter mode in which a first filter mode reciprocating from the first height to the third height and a second filter mode reciprocating from the second height to the third height are complexly performed.

The ink supply unit may have a cylindrical shape, and may be mounted on the spray head in an interpolation manner or an extrapolation manner in a mutual correspondence to the spray head.

The ink filling unit may perform initial ink filling when initial mass production facilities of the printing unit are set and a replacement of parts including at least the spray head of the printing unit is performed.

The ink may include a quantum dot-based ink operated at a room temperature and in the atmosphere.

The ink filling unit may further include a first sensor unit generating a sensing signal by sensing a filling level of the ink in the ink supply unit, and may adjust the filling level of the ink based on the first sensor unit.

The ink filling unit may further include an ink discharge unit supplying the ink supplied from the supply ink receptor to the ink supply unit through a first path, and an ink recovery unit draining the ink filled in the ink supply unit to the supply ink receptor through a second path, and the ink discharge unit and the ink recovery unit may adjust the filling level of the ink based on the sensing signal.

The pressure controller may be communicated with the printing ink receptor through a third path, and the printing unit may further include a negative pressure providing unit providing a negative pressure to the third path to control a pressure of the pressure controller.

The printing ink receptor may be communicated with the spray head through a fourth path, and the spray head may supply the ink supplied through the ink supply unit to the printing ink receptor.

The printing ink receptor may be communicated with the spray head through a fifth path, a circulation module may be provided on the fifth path to supply ink from the spray head unit to the printing ink receptor by pumping the ink, the fifth path may include a (5-1)th path connected to the spray head on one side of the circulation module based on the circulation module and a (5-2)th path connected to the printing ink receptor on the other side of the circulation module, the printing ink receptor may supply the ink therein to the spray head in a state that the printing unit and the ink filling unit are not mounted, and the circulation module may supply the ink in the spray head to the printing ink receptor to circulate the ink on the printing unit, thereby suppressing precipitation of a precipitate remaining in the ink.

The ink supplied through the (5-1)th path may be accommodated in an inner space of the circulation module and the ink in the inner space may be discharged to the printing ink receptor through the (5-2)th path, the inner space of the circulation module may include a first area in which the ink is accommodated by being loaded, and a second area that is an upper area of the first area, in which the ink from the first area does not reach there and the air remains, and the printing unit may further include a suction module performing air suction on the second area to prevent pumping from the (5-1)th path to the (5-2)th path from being hindered by the air on the second area when performing a pumping operation toward the (5-2)th path from the (5-1)th path of the circulation module.

The suction module may include an ink trap unit communicated with the second area of the circulation module through a sixth path, and a suction force providing unit providing a suction force to the second area of the circulation module by means of the ink trap unit to suck the air on the second area, and when the ink of the first area is sucked based on the suction force of the suction force providing unit, the ink trap unit may accommodate the sucked ink therein.

The suction module may further include an intake ink discharge unit provided in the ink trap unit to discharge ink remaining in the ink trap unit, and a nitrogen purge unit performing nitrogen purge for the ink trap unit to discharge the ink through the intake ink discharge unit.

A printing apparatus according to another aspect of the present disclosure devised to achieve the above objects may comprise a printing unit performing printing, and an ink filling unit filling ink in the printing unit in an upward manner, wherein the printing unit may include a printing ink receptor accommodating ink, a spray head for spraying the ink, and a pressure controller controlling a pressure of a fluid for operation of the ink, the ink filling unit may include a supply ink receptor filled with ink for supply to the printing unit, an ink supply unit mounted on the spray head to supply the ink supplied from the supply ink receptor to the spray head, a first sensor unit sensing a filling level of the ink in the ink supply unit to generate a sensing signal, an ink discharge unit supplying the ink supplied from the supply ink receptor to the ink supply unit through a first path, and an ink recovery unit draining the ink filled in the ink supply unit through a second path to the supply ink receptor, the ink filling unit may adjust the filling level of the ink based on the first sensor unit, and the ink discharge unit and the ink recovery unit may adjust the filling level of the ink based on the sensing signal, the pressure controller may be communicated with the printing ink receptor through a third path, the printing unit may further include a negative pressure providing unit providing a negative pressure to the third path to control the pressure of the pressure controller, the printing ink receptor may be communicated with the spray head through a fourth path, the spray head may supply the ink supplied through the ink supply unit to the printing ink receptor, the printing ink receptor may be communicated with the spray head through a fifth path, a circulation module may be provided on the fifth path to supply ink from the spray head unit to the printing ink receptor by pumping the ink, the fifth path may include a (5-1)th path connected to the spray head on one side of the circulation module based on the circulation module and a (5-2)th path connected to the printing ink receptor on the other side of the circulation module, the printing ink receptor may supply the ink therein to the spray head in a state that the printing unit and the ink filling unit are not mounted, the circulation module may supply the ink in the spray head to the printing ink receptor to circulate the ink on the printing unit, thereby suppressing precipitation of a precipitate remaining in the ink.

An ink refill method of a printing apparatus according to other aspect of the present disclosure devised to achieve the above objects may comprise preparing a printing unit, mounting an ink filling unit on the printing unit, and filling the printing unit with ink in an upward manner by the ink filling unit, wherein the printing unit may include a printing ink receptor accommodating ink, a spray head spraying the ink, and a pressure controller controlling a pressure of a fluid for operation of the ink, and the ink filling unit may include a supply ink receptor filled with ink for supply to the printing unit, and an ink supply unit mounted on the spray head to supply the ink supplied from the supply ink receptor to the spray head.

The printing apparatus and the ink refill method of the present disclosure have one or more advantageous effects as follows.

The present disclosure may provide a printing apparatus that may quickly perform a process and improve workability by shortening a filling time of initial ink based on an impeller pump provided with an air pocket extractor.

The present disclosure may provide a printing apparatus that may minimize gaps in ink filling.

The present disclosure may provide a printing apparatus that may improve workability and shorten a setting time in setting initial mass production facilities through rapid filling of initial ink in a pump.

The present disclosure may provide a printing apparatus that may supply ink more effectively at the time when ink re-fill is required due to replacement of a head and related parts.

The present disclosure may provide a printing apparatus that may reduce material usage and cost by minimizing consumption of expensive ink of tens of millions of won per liter.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a schematic view illustrating components of a printing apparatus according to one embodiment of the present disclosure;

FIG. 2 is a view illustrating a portion of the components according to FIG. 1;

FIGS. 3 to 5 are views illustrating an operation state of the components according to FIG. 1;

FIGS. 6 and 7 are views illustrating a coupling process of the components according to FIG. 1;

FIG. 8 is a view illustrating a configuration of a coupling means for coupling of the components according to FIG. 6; and FIG. 9 is a view illustrating an ink refill method of a printing apparatus according to one embodiment of the present disclosure.

DETAILED DESCRIPTION OF THE DISCLOSURE

Hereinafter, the preferred embodiment of the present disclosure will be described in detail with reference to the accompanying drawings. Advantages and features of the present disclosure and methods of achieving the advantages and features will be apparent from the following embodiments that will be described in more detail with reference to the accompanying drawings. It should be noted, however, that the present disclosure is not limited to the following embodiments, and may be implemented in various forms. The embodiments are provided only to disclose the present disclosure and let those skilled in the art understand the scope of the present disclosure. In the drawings, the embodiments of the present disclosure are defined by the scope of claims. The same reference numerals denote the same elements throughout the specification.

Spatially relative terms, such as “below,” “beneath,” “lower,” “above,” “upper” and the like, may be used herein to easily describe one element or feature’s relationship to another element(s) or feature(s) as illustrated in the drawings. It should be understood that the spatially relative terms are intended to encompass different directions of an element in use or operation in addition to the direction depicted in the drawings. For example, if the element shown in the drawings is turned over, elements described as “below” or “beneath” other elements or features would then be oriented “above” the other elements or features. Thus, the exemplary term “below” can encompass both a direction of above and below. The element may be otherwise oriented, and thus the spatially relative terms used herein interpreted depending on the orientation.

It should be understood that although the terms “first,” “second,” etc. may be used herein to describe various elements and/or sections, these elements and/or sections should not be limited by these terms. These terms are only used to distinguish one element, component, or sections from another element, component or sections. Thus, “a first element,” “first component,” of “first section” discussed below could be termed a second element, second component or second section without departing from the technical spirits of the present disclosure.

The terms used herein are for the purpose of embodiments, and are not intended to be limit the present disclosure. In the present disclosure, unless referred to the contrary, the singular forms are intended to include the plural forms. The terms “comprises” and/or “comprising” used herein specify the presence of stated elements, steps, operations and/or targets but do not preclude the presence or addition of one or more other elements, steps, operations and/or targets.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the embodiments of the present disclosure will be described in detail with reference to the accompanying drawings, in which the same reference numerals are used for the substantially same elements, and a repeated description of the corresponding elements will be omitted.

Referring to FIG. 1, a printing apparatus according to one embodiment of the present disclosure includes a printing unit 110 and an ink filling unit 120. The printing unit 110 includes a printing ink receptor 111, an injection head unit 112, a pressure controller 113, a suction module 115, and a negative pressure providing unit 116.

The suction module 115 includes an ink trap unit 1151, a suction force providing unit 1152, a nitrogen purge unit 1153, and an intake ink discharge unit 1154. The ink filling unit 120 includes a supply ink receptor 121, an ink discharge unit 122, an ink recovery unit 123, an ink supply unit 124, and a first sensor unit S1.

The printing unit 110 performs printing. In detail, ink for printing is accommodated in the printing ink receptor 111 of the printing unit 110. The injection head 112 of the printing unit 110 includes a spray head 1121 through which the ink is sprayed.

In addition, the pressure controller 113 of the printing unit 110 controls the pressure of the fluid for operation of the ink. The ink filling unit 120 fills the ink in the printing unit 110 in an upward manner.

In detail, the supply ink receptor 121 of the ink filling unit 120 is filled with ink for supplying the ink to the printing unit 110. The ink supply unit 124 of the ink filling unit 120 is mounted on the spray head unit 112.

The ink supply unit 124 supplies the ink supplied from the supply ink receptor 121 to the spray head 1121. The ink supply unit 124 is mounted toward an ink spray direction of the spray head 1121 to supply the ink.

On the other hand, the ink may be filled from the spray head unit 112 in the direction of the printing ink receptor 111 based on the negative pressure generated by the negative pressure providing unit 116 without an empty space and an air pocket.

Referring to FIGS. 2 to 4, the ink supply unit 124 includes a filter unit 1241 therein. The ink filled in the ink supply unit 124 is filtered through the filter unit 1241 to be supplied to the spray head 1121.

In addition, the filter unit 1241 moves up and down inside the ink supply unit 124 in a sliding manner. The filter unit 1241 may operate in response to a water level of the ink inside the ink supply unit 124.

The ink supply unit 124 may be positioned at a first height L1 of the filter unit 1241. At this time, the water level of the ink in the ink supply unit 124 may be positioned at a second height L2 lower than a first height L1. This is assumed as a first condition.

When the first condition is formed, the filter unit 1241 may move to a third height L3, which is lower than the second height L2 on the ink supply unit 124.

The filter unit 1241 is operated in first to third filter modes. The first filter mode allows the filter unit 124 to reciprocate from the first height to the third height.

In the second filter mode, the filter unit 124 reciprocates from the first height to the third height. The third filter mode allows the filter unit 124 to reciprocate from the second height to the third height.

The filter unit 124 may operate in the first to third filter modes. In addition, the filter unit 1241 may be operated in a fourth filter mode in which the first to third filter modes are complexly performed. The filter unit 124 may move in response to the ink level of the ink supply unit 124.

Referring to FIG. 1, the ink filling unit 120 may perform initial ink filling when initial mass production facilities of the printing unit 110 are set and a replacement of parts including at least the spray head 1121 of the printing unit 110 is performed.

The ink described above includes a quantum dot-based ink operated at a room temperature and in the atmosphere. The first sensor unit S1 of the ink filling unit 120 senses a filling level of the ink in the ink supply unit 124 to generate a sensing signal.

The ink filling unit 120 adjusts a filling level of the ink based on the first sensor unit S1. The ink discharge unit 122 of the ink filling unit 120 supplies the ink supplied from the supply ink receptor 121 to the ink supply unit 124 through a supply path P11.

The ink recovery unit 123 of the ink filling unit 120 supplies the ink filled in the ink supply unit 124 to the supply ink receptor 121 through a recovery path P12.

The ink discharge unit 122 and the ink recovery unit 123 of the ink filling unit 120 adjusts the filling level of the ink based on the sensing signal.

The pressure controller 113 is communicated with the printing ink receptor 111 through a first path P1. In addition, the negative pressure providing unit 116 of the printing unit 110 provides a negative pressure through a second path P2 communicated with the first path P1 to control the pressure of the pressure controller 113.

The printing ink receptor 111 is communicated with the spray head 1121 through a third path P3. The spray head 1121 supplies the ink supplied through the ink supply unit 124 to the printing ink receptor 111.

The printing ink receptor 111 is communicated with the spray head 1121 through fourth paths P41 and P42. A circulation module 114 for pumping and supplying ink from the spray head unit 112 to the printing ink receptor 111 is provided on the fourth paths P41 and P42.

At this time, the fourth paths P41 and P42 are provided to include a (4-1)th path P41 connected to the spray head 1121 on one side of the circulation module 114 based on the circulation module 114, and a (4-2)th path P42 connected to the printing ink receptor 111 on the other side of the circulation module 114.

The printing ink receptor 111 supplies the ink therein to the spray head 1121 in a state that the printing unit 110 and the ink filling unit 120 are not mounted.

The circulation module 114 supplies ink in the spray head 1121 to the printing ink receptor 111 to circulate the ink on the printing unit 110, thereby suppressing precipitation of a precipitate remaining in the ink. In this case, the operation of the circulation module 114 is performed at the time of at least one timing of the operation before, during or after the operation of the printing unit 110.

The circulation module 114 accommodates the ink supplied through the (4-1)th path P41 in its inner space. The circulation module 114 discharges the ink in the inner space to the printing ink receptor 111 through the (4-2)th path P42.

The inner space of the circulation module 114 is provided to include a first area SP1 in which the ink is accommodated by being loaded, and a second area SP2 that is an upper area of the first area SP1, in which the ink from the first area SP1 does not reach there and the air remains.

In this case, the suction module 115 of the printing unit 110 prevents pumping from the (4-1)th path P41 to the (4-2)th path P42 of the circulation module 114 from being hindered by the air on the second area SP2 when performing a pumping operation toward the (4-2)th path P42 from the (4-1)th path P41 of the circulation module 114.

In detail, the suction module 115 of the printing unit 110 performs air suction on the second area SP2.

Referring to FIG. 5, the ink trap unit 1151 of the suction module 115 is communicated with the second area SP2 of the circulation module 114 through a fifth path P5. The suction force providing unit 1152 of the suction module 115 provides a suction force to the second area SP2 of the circulation module 114 via the ink trap unit 1151 to suck the air on the second area SP2.

When the ink of the first area SP1 is sucked based on the suction force of the suction force providing unit 1152, the ink trap unit 1151 accommodates the ink therein to prevent the sucked ink from flowing into the suction force providing unit 1152.

In addition, the intake ink discharge unit 1154 of the suction module 115 is provided in the ink trap unit 1151 to discharge the ink remaining in the ink trap unit 1151. The nitrogen purge unit 1153 of the suction module 115 performs a nitrogen-based purge for the ink trap unit 1151 through a sixth path P6, so that the intake ink discharge unit 1154 discharges the ink.

Referring to FIGS. 6 to 7, the spray head unit 112 and the ink supply unit 124 need to be mounted on mutual proper positions. For example, when the spray head unit 112 is mounted by entering the ink supply unit 124, the spray head unit 112 needs to properly enter the ink supply unit 124 in consideration of the water level of the ink in the ink supply unit 124.

To this end, the spray head unit 112 is mounted on the ink supply unit 124 in consideration of the water level of the ink inside the ink supply unit 124 based on the sensing signal of the first sensor unit S1 described above.

The spray head unit 112 needs to be mounted on the ink supply unit 124 by correcting vertical and horizontal positions therebetween. To this end, the spray head unit 112 includes a second sensor unit S2 near the ink supply unit 124.

The second sensor unit S2 senses the positions of the spray head unit 112 and the ink supply unit 124 to generate a second sensing signal. A position correction for mounting the spray head unit 112 and the ink supply unit 124 is performed based on the second sensing signal.

To this end, the spray head unit 112 is provided with a position correction unit 125 moving from left to right and up and down, intended for correcting the position of the ink supply unit 124.

The position correction unit 125 includes a driving base unit 1251, a driving body unit 1252, a vertical moving body 1253, one side fixture 1254, and other side fixture 1255. The driving base unit 1251 provides a driving force to the driving body unit 1252.

The driving body unit 1252 may move from side to side forward and backward to move the ink supply unit 124 positioned thereon. The vertical moving body 1253 is provided on the driving body unit 1252 and moves the ink supply unit 124 up and down through up and down movement.

The one side fixture 1254 and the other side fixture 1255 may be fixed in contact with at least a portion of the circumference of the ink supply unit 124 in the driving body unit 1252. The one side fixture 1254 and the other side fixture 1255 inhibit the movement of the ink supply unit 124 when the driving body unit 1252 moves from the driving base unit 1251.

Referring to FIG. 9, an ink refill method (S100) of a printing apparatus according to one embodiment of the present disclosure includes the steps of preparing a printing unit 110 (S110), mounting the ink filling unit 120 on the printing unit 110 (S120), and filling the printing unit 110 with ink by the ink filling unit in an upward manner (S130).

In this case, the printing ink receptor 111 of the printing unit 110 accommodates the ink, and the spray head unit 112 of the printing unit 11 sprays the ink. The pressure controller 113 of the printing unit 110 controls the pressure of the fluid for operation of the ink.

The supply ink receptor 121 of the ink filling unit 120 is filled with the ink for supply to the printing unit 110. The ink supply unit 124 of the ink filling unit 120 is mounted on the spray head 1121 and supplies the ink supplied from the supply ink receptor 121 to the spray head 1121.

Although the embodiments of the present disclosure have been described with reference to the accompanying drawings, it will be apparent to those skilled in the art that the present disclosure can be embodied in other specific forms without departing from the technical spirits and essential characteristics of the present disclosure. Thus, the above-described embodiments are to be considered in all respects as illustrative and not restrictive.

What is claimed is:

1. A printing apparatus comprising:
- a printing unit performing printing; and
- an ink filling unit filling ink in the printing unit in an upward manner,
- wherein the printing unit includes:
- a printing ink receptor accommodating ink;
- a spray head unit having a spray head for spraying the ink; and
- a pressure controller controlling a pressure of a fluid for operation of the ink, and
- the ink filling unit includes:
- a supply ink receptor filled with ink for supply to the printing unit; and
- an ink supply unit mounted on the spray head to supply the ink supplied from the supply ink receptor to the spray head,
- wherein the ink supply unit comprises a filter unit configured to filter the ink, supply the filtered ink to the spray head, move up and down inside the ink supply unit in a sliding manner and be operable in response to a water level of the ink inside the ink supply unit.

2. The printing apparatus of claim 1, wherein the ink supply unit is mounted toward an ink spray direction of the spray head to supply the ink.

3. The printing apparatus of claim 1, wherein the filter unit of the ink supply unit moves to a third height lower than a second height on the ink supply unit when a first condition is provided in which the filter unit is positioned at a first height and the water level of the ink inside the ink supply unit is positioned at the second height lower than the first height.

4. The printing apparatus of claim 3, wherein the filter unit is operated in a first filter mode reciprocating from the first height to the third height and a second filter mode reciprocating from the second height to the third height.

5. The printing apparatus of claim 3, wherein the filter unit is operated in a third filter mode in which a first filter mode reciprocating from the first height to the third height and a second filter mode reciprocating from the second height to the third height are complexly performed.

6. The printing apparatus of claim 3, wherein the ink supply unit has a cylindrical shape and is mounted on the spray head in an interpolation manner or an extrapolation manner in a mutual correspondence to the spray head.

7. The printing apparatus of claim 3, wherein the ink filling unit further includes:
- an ink discharge unit supplying the ink supplied from the supply ink receptor to the ink supply unit through a first path; and
- an ink recovery unit draining the ink filled in the ink supply unit to the supply ink receptor through a second path, and
- the ink discharge unit and the ink recovery unit adjust the filling level of the ink based on the sensing signal.

8. The printing apparatus of claim 1, wherein the ink filling unit performs initial ink filling when initial mass production facilities of the printing unit are set and a replacement of parts including at least the spray head of the printing unit is performed.

9. The printing apparatus of claim 1, wherein the ink includes a quantum dot-based ink operated at a room temperature and in the atmosphere.

10. The printing apparatus of claim 1, wherein the ink filling unit further includes a first sensor unit sensing a filling level of the ink in the ink supply unit to generate a sensing signal, and adjusts the filling level of the ink based on the first sensor unit.

11. The printing apparatus of claim 1, wherein the pressure controller is communicated with the printing ink receptor through a third path, and
- the printing unit further includes a negative pressure providing unit providing a negative pressure to the third path to control a pressure of the pressure controller.

12. The printing apparatus of claim 11, wherein the printing ink receptor is communicated with the spray head through a fourth path, and
- the spray head supplies the ink supplied through the ink supply unit to the printing ink receptor.

13. The printing apparatus of claim 11, wherein the printing ink receptor is communicated with the spray head through a fifth path,
- a circulation module is provided on the fifth path to supply ink from the spray head unit to the printing ink receptor by pumping the ink,
- the fifth path includes a (5-1)th path connected to the spray head on one side of the circulation module based on the circulation module and a (5-2)th path connected to the printing ink receptor on the other side of the circulation module,
- the printing ink receptor supplies the ink therein to the spray head in a state that the printing unit and the ink filling unit are not mounted, and
- the circulation module supplies the ink in the spray head to the printing ink receptor to circulate the ink on the printing unit, thereby suppressing precipitation of a precipitate remaining in the ink.

14. The printing apparatus of claim 13, wherein the ink supplied through the (5-1)th path is accommodated in an inner space of the circulation module and the ink in the inner space is discharged to the printing ink receptor through the (5-2)th path,
- the inner space of the circulation module includes a first area in which the ink is accommodated by being loaded, and a second area that is an upper area of the first area, in which the ink from the first area does not reach there and the air remains, and
- the printing unit further includes a suction module performing air suction on the second area to prevent pumping from the (5-1)th path to the (5-2)th path from being hindered by the air on the second area when performing a pumping operation toward the (5-2)th path from the (5-1)th path of the circulation module.

15. The printing apparatus of claim 14, wherein the suction module includes:

an ink trap unit communicated with the second area of the circulation module through a sixth path; and a suction force providing unit providing a suction force to the second area of the circulation module by means of the ink trap unit to suck the air on the second area, and when the ink of the first area is sucked based on the suction force of the suction force providing unit, the ink trap unit accommodates the sucked ink therein.

16. The printing apparatus of claim 15, wherein the suction module further includes:

an intake ink discharge unit provided in the ink trap unit to discharge ink remaining in the ink trap unit; and a nitrogen purge unit performing nitrogen purge for the ink trap unit to discharge the ink through the intake ink discharge unit.

17. A printing apparatus comprising:

a printing unit performing printing; and an ink filling unit filling ink in the printing unit in an upward manner, wherein the printing unit includes a printing ink receptor accommodating ink, a spray head for spraying the ink, and a pressure controller controlling a pressure of a fluid for operation of the ink, the ink filling unit includes a supply ink receptor filled with ink for supply to the printing unit, an ink supply unit mounted on the spray head to supply the ink supplied from the supply ink receptor to the spray head, a sensor unit sensing a filling level of the ink in the ink supply unit to generate a sensing signal, an ink discharge unit supplying the ink supplied from the supply ink receptor to the ink supply unit through a first path, and an ink recovery unit draining the ink filled in the ink supply unit through a second path to the supply ink receptor, the ink filling unit adjusts the filling level of the ink based on the sensor unit, and the ink discharge unit and the ink recovery unit adjust the filling level of the ink based on the sensing signal, the pressure controller is communicated with the printing ink receptor through a third path, the printing unit further includes a negative pressure providing unit providing a negative pressure to the third path to control the pressure of the pressure controller, the printing ink receptor is communicated with the spray head through a fourth path, the spray head supplies the ink supplied through the ink supply unit to the printing ink receptor, the printing ink receptor is communicated with the spray head through a fifth path, a circulation module is provided on the fifth path to supply ink from the spray head unit to the printing ink receptor by pumping the ink, the fifth path includes a (5-1)th path connected to the spray head on one side of the circulation module based on the circulation module and a (5-2)th path connected to the printing ink receptor on the other side of the circulation module, the printing ink receptor supplies the ink therein to the spray head in a state that the printing unit and the ink filling unit are not mounted, the circulation module supplies the ink in the spray head to the printing ink receptor to circulate the ink on the printing unit, thereby suppressing precipitation of a precipitate remaining in the ink.

18. An ink refill method of a printing apparatus, comprising:

preparing a printing unit;

mounting an ink filling unit on the printing unit; and filling the printing unit with ink in an upward manner by the ink filling unit, wherein the printing unit includes a printing ink receptor accommodating ink, a spray head spraying the ink, and a pressure controller controlling a pressure of a fluid for operation of the ink, and the ink filling unit includes a supply ink receptor filled with ink for supply to the printing unit, and an ink supply unit mounted on the spray head to supply the ink supplied from the supply ink receptor to the spray head, wherein the ink supply unit comprises a filter unit configured to filter the ink, supply the filtered ink to the spray head, move up and down inside the ink supply unit in a sliding manner and be operable in response to a water level of the ink inside the ink supply unit.

* * * * *